(12) United States Patent
Jun et al.

(10) Patent No.: US 12,516,979 B2
(45) Date of Patent: Jan. 6, 2026

(54) OPTICAL MODULE, SPECTROSCOPIC DEVICE FOR HYPERSPECTRAL IMAGING, AND IMAGING MEASUREMENT METHOD USING THE SAME

(71) Applicant: Samsung Electronics Co., Ltd., Suwon-si (KR)

(72) Inventors: Sunhong Jun, Suwon-si (KR); Sung Yoon Ryu, Suwon-si (KR); Younghoon Sohn, Suwon-si (KR); Eunsoo Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 18/442,539

(22) Filed: Feb. 15, 2024

(65) Prior Publication Data

US 2025/0076116 A1    Mar. 6, 2025

(30) Foreign Application Priority Data

Sep. 4, 2023    (KR) .......................... 10-2023-0117194

(51) Int. Cl.
*G01J 3/18*    (2006.01)
*G01J 3/02*    (2006.01)
*G01J 3/28*    (2006.01)

(52) U.S. Cl.
CPC ............ *G01J 3/2823* (2013.01); *G01J 3/021* (2013.01); *G01J 3/0218* (2013.01); *G01J 3/0229* (2013.01); *G01J 3/0297* (2013.01); *G01J 3/2803* (2013.01); *G01J 2003/2826* (2013.01)

(58) Field of Classification Search
CPC ...... G01J 3/2823; G01J 3/0218; G01J 3/0229; G01J 3/2803; G01J 2003/2826; G01J 3/0208; G01J 3/06; G01J 3/18
See application file for complete search history.

(56) References Cited

U.S. PATENT DOCUMENTS

| 9,435,689 B2 * | 9/2016 | Comstock, II ........ G01J 3/2823 |
| 9,733,178 B2 | 8/2017 | Ryu et al. |
| 11,043,433 B2 | 6/2021 | Ryu et al. |
| 11,079,273 B2 | 8/2021 | Kasim et al. |
| 11,268,854 B2 | 3/2022 | Han et al. |
| 2005/0254709 A1 * | 11/2005 | Geshwind .............. G06V 10/56 382/182 |
| 2016/0025618 A1 | 1/2016 | Ryu et al. |
| 2020/0072668 A1 | 3/2020 | Han et al. |

(Continued)

FOREIGN PATENT DOCUMENTS

| CN | 107655569 A | * | 2/2018 | ............ G01J 3/2823 |
| KR | 20130015624 A | | 2/2013 | |

(Continued)

*Primary Examiner* — Abdullahi Nur
(74) *Attorney, Agent, or Firm* — Wolf, Greenfield & Sacks, P.C.

(57) ABSTRACT

An optical module includes: a diffraction grating configured to rotate and focus a beam, which is incident thereon from an incident path, onto a Fourier plane, a digital micromirror array (DMD) configured to assign a frequency for each wavelength of the focused beam received at the Fourier plane, and perform a Fourier transform for each frequency, and a first optical fiber configured to receive a beam that is reflected back from the DMD back and the diffraction grating, and along the incident path.

20 Claims, 7 Drawing Sheets

(56) References Cited

U.S. PATENT DOCUMENTS

| | | | |
|---|---|---|---|
| 2020/0158568 A1 | 5/2020 | Kasim et al. | |
| 2020/0194294 A1 | 6/2020 | Jang et al. | |
| 2020/0203232 A1 | 6/2020 | Ryu et al. | |
| 2022/0252451 A1 | 8/2022 | Kim et al. | |
| 2022/0404197 A1 | 12/2022 | Yasuhiro et al. | |

FOREIGN PATENT DOCUMENTS

| | | |
|---|---|---|
| KR | 101249240 B1 | 4/2013 |
| KR | 20220141945 A | 10/2022 |

\* cited by examiner

OPTICAL MODULE, SPECTROSCOPIC DEVICE FOR HYPERSPECTRAL IMAGING, AND IMAGING MEASUREMENT METHOD USING THE SAME

REFERENCE TO PRIORITY APPLICATION

This application claims priority to Korean Patent Application No. 10-2023-0117194, filed Sep. 4, 2023, the disclosure of which is hereby incorporated herein by reference.

BACKGROUND

The present disclosure relates to optical modules, spectroscopic devices for imaging, and imaging measurement methods.

A hyperspectral image is an image photographed by a camera that divides the light into tens to hundreds of bands according to wavelength, and typically has three characteristics of having many spectral bands, being continuous, and having a relatively narrow wavelength. A hyperspectral sensor obtains several hundred to several thousand pieces of spectroscopic information with respect to an object corresponding to each pixel of the image through spectral splitting of an incident light, and images generated by these sensors may be referred to as hyperspectral images.

Unlike for ordinary images where conventional image sensors obtain an image by separating wavelength information (color band) into a single or several levels in wavelength bands such as visible light or infrared, a hyperspectral image is one that improves the capability of identifying targets by subdividing the wavelength band (width) into one hundred to several hundred pieces of wavelength information (color band), such that a hyperspectral image spectrum has high wavelength resolution, covers a wide range of wavelengths, and includes spatial spectral information from substances in the hyperspectral image.

Hyperspectral images may be said to be data from which a complete spectral reflectance curve of the surface material corresponding to each pixel constituting the image may be obtained, such that in applications where aircraft-mounted hyperspectral image data is gathered for fields such as geology, the accurate identification of the distribution of mineral resources and classification of rock types may be achieved. Moreover, in the field of vegetation, many studies are being conducted to estimate the biochemical constituents of plants (e.g., chlorophyll, carbon concentration/quantity, nitrogen concentration/quantity, lignin concentration/quantity, etc.), and further attempts are being made to detect various stresses that can appear in plants. And, applications for hyperspectral image generation are currently expanding into fields of water quality monitoring related to the estimation of chlorophyll content using hyperspectral images and classification of various artifacts in urban areas.

Over the past 10 years, hyperspectral imaging has been extensively researched to enable physically meaningful images beyond human vision, and conventionally, spectral scanning, computed tomography imaging, and snapshot compression imaging have been used. As will be understood by those skilled in the art, scanning-based approaches based on dispersive optical elements such as prisms or diffraction gratings may capture light of each wavelength, through a slit, a so-called whiskbroom or pushbroom scanner. Scanning yields high spatial and spectral resolution, but target objects are limited to static objects or remote scenes.

Computer tomography imaging spectrometry (CTIS) was introduced to alleviate the limitations of scanning methods, and uses a diffraction grating with a relay lens and an image, where the diffraction grating splits collimated incident light into different diffraction patterns in different directions, sacrificing the spatial resolution of computed tomography. Furthermore, coded aperture snapshot spectral imaging (CASSI) has been introduced to capture dynamic objects, where a distributed optical element becomes a coded aperture through the relay lens in order to code spectral or spatial spectral signals, and all of these requires several geometric optical elements in order to collimate and distribute the light (or modulate the light in the case of CASSI), which causes a drawback of a large volume.

SUMMARY

The present disclosure attempts to provide an optical module, a spectroscopic device for hyperspectral imaging, and an imaging measurement method using the same, in which the time for obtaining a wavelength high-resolution hyperspectral cube data is not increased, yet the stability of the facility is enhanced since high-speed rotational movement of a conventional grating unit is eliminated.

In addition, an optical module, a spectroscopic device for hyperspectral imaging, and an imaging measurement method using the same, are capable of compensating for fluctuations in light source intensity by checking the light source intensity in real time and using it as a compensation reference.

An optical module may include: a diffraction grating configured to split a beam that is incident on a slit and rotate and focus a beam path on a Fourier plane, a digital micromirror array (DMD), which is configured to assign a natural frequency for each wavelength of the focused beam and perform Fourier transform for each frequency, and a first optical fiber, which is configured to pass a beam reflected at the DMD back to an incident path after having passed through the diffraction grating.

A spectroscopic device for hyperspectral imaging may include an optical module including a diffraction grating configured to split a beam emitted from a light source and incident through a slit and rotate and focus a beam path, a digital micromirror array (DMD) configured to assign a natural frequency for each wavelength of the focused beam, a first optical fiber configured to pass a first beam re-reflected at the digital micromirror array (DMD), a hyperspectral image system (HIS) configured to receive the first beam having passed through the first optical fiber, and direct the first beam reflected from a sample to be incident on a CMOS device, which contains a lock-in amplifier module.

An imaging measurement method may include a step of encoding, by the digital micromirror array (DMD), a beam that is emitted from a light source and passed through a diffraction grating at different frequencies for respective wavelengths. A first beam is then re-reflected from the digital micromirror array (DMD) and passed by the diffraction grating to a first optical fiber, before being transmitted to a hyperspectral imaging system (HIS), and then transmitted by the HIS and reflected from a sample of the hyperspectral imaging system (HIS) to a CMOS device containing a lock-in amplifier module, to thereby obtain hyperspectral imaging data by using the encoded beam and the CMOS device interlocked with the digital micromirror array (DMD).

According to further embodiments, by using a toroidal diffraction grating, the possibility of misalignment between optics may be lowered, and signal stability may be raised. In addition, if Fourier transformed images are re-arranged in order of wavelength, when the hyperspectral imaging cube is reconstructed, the measurement time may not be increased even if the number of wavelengths increases. Finally, real-time signal strength compensation may be performed by performing monitoring using certain light sources.

DETAILED DESCRIPTION OF EMBODIMENTS

Figure 1:
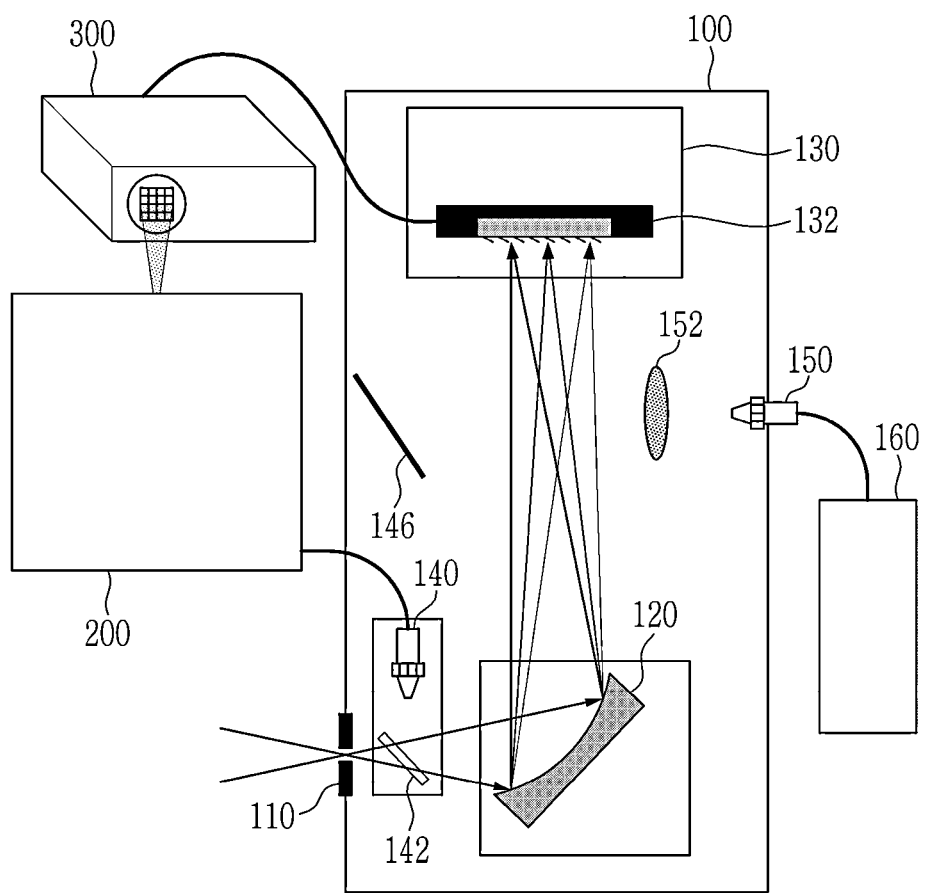
FIG. 1 is a drawing showing a spectroscopic device for hyperspectral imaging including an optical module, according to an embodiment.

The present disclosure will be described in detail herein with reference to the accompanying drawings, in which embodiments of the present disclosure are shown. As those skilled in the art would realize, the described embodiments may be modified in various different ways, without departing from the spirit or scope of the present disclosure. The drawings and description are to be regarded as illustrative in nature and not restrictive. Like reference numerals designate like elements throughout the specification.

In addition, the sizes and thicknesses of each constituent element in the drawings are illustrated for better understanding and ease of description, but the following embodiments are not limited thereto. In the drawings, the thickness of layers, films, panels, regions, etc., may be exaggerated for clarity. In the drawings, the thickness of some layers and regions may be exaggerated for ease of description. Throughout this specification and the claims that follow, when it is described that an element is "coupled" to another element, it includes not only the case of being "directly coupled" but also "indirectly coupled" with another element therebetween.

In addition, unless explicitly described to the contrary, the word "comprise", and variations such as "comprises" or "comprising", will be understood to imply the inclusion of stated elements but not the exclusion of any other elements. Also, it will be understood that when an element such as a layer, film, region, area, or substrate is referred to as being "on" or "above" another element, it can be directly on the other element or intervening elements may also be present.

In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity. Furthermore, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Figure 2:
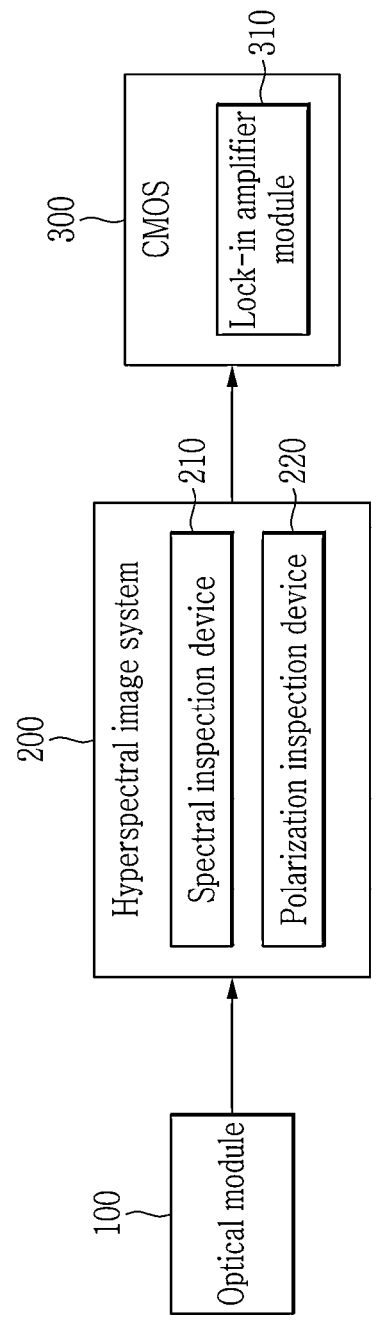
FIG. 2 is a drawing for explaining a spectroscopic device for hyperspectral imaging including an optical module, according to an embodiment.
Figure 3:
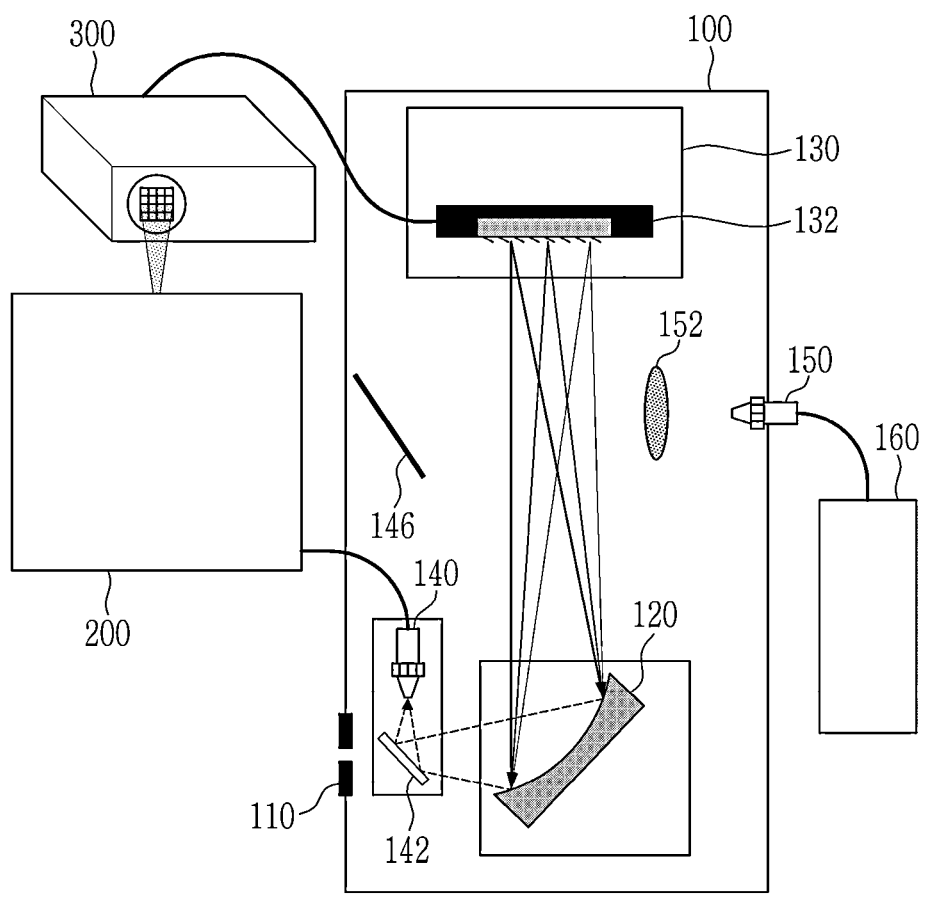
FIG. 3 is a drawing for explaining a spectroscopic device for hyperspectral imaging including an optical module, according to an embodiment.

Hereinafter, an optical module 100 according to an embodiment, a spectroscopic device 10 for hyperspectral imaging, and an imaging measurement method using the same according to the present disclosure will be described in detail with reference to the drawings. In particular, FIGS. 1-3 are drawings that illustrate an embodiment of the spectroscopic device 10 for hyperspectral imaging including an optical module 100. As shown by FIGS. 1-3, an optical module 100 of the spectroscopic device 10 for hyperspectral imaging may include: a diffraction grating 120 configured to split a beam incident on/through a slit 110 and rotate and focus a beam path on a Fourier plane 132, a digital micromirror array (DMD) 130 configured to assign a natural frequency for each wavelength of the focused beam and perform Fourier transform for each frequency, and a first optical fiber 140 configured to pass a beam reflected at the digital micromirror array (DMD) 130 back to an optical path associated with the incident path through the slit 110 and the diffraction grating 120.

More specifically, FIG. 1 illustrates that the beam emitted from a light source and incident through the slit 110 is split by the diffraction grating 120, yet at the same time is collimated and its beam path is rotated, so as to be focused on the Fourier plane 132. At this time, the digital micromirror array (DMD) 130 is positioned on the Fourier plane 132 receiving the focused beam.

The diffraction grating 120 according to the present disclosure serves to collimate the beam from the broadband light source incident through the slit 110. The diffraction grating 120 is a reflective diffraction grating 120, and may include a toroidal diffraction grating 120. The toroidal diffraction grating 120 may combine three optical elements, including a collimation lens, a diffraction grating, and a focusing lens, into one grating and may enhance stability by increasing a consistency of an optical path, and decreasing a size of the configuration apparatus.

Conventionally, for hyperspectral imaging measurements, 2-dimensional images are obtained using a high-speed motor-based reflective diffraction grating rotating monochromator. Moreover, a 3-dimension hyperspectral cube is formed by sequentially measuring 2-dimensional image of each wavelength, by utilizing the monochromator of the reflective diffraction grating capable of rapidly rotating for splitting of wide wavelength range light source at the time of hyperspectral image measurement, where there was a typical problem that, in the conventional art, as the wavelength resolution increases, the measurement time is proportionally increased.

In the case of a VNAND (i.e., vertical NAND) compared to a DRAM, in order to obtain data so as not to damage the spectrum information, a wavelength resolution of 5 to 10 times (5 to 10 nm in the case of DRAM and 1 nm or less in the case of VNAND) is typically required. According to the conventional art, the time consumed for the measurement increases proportionally to wavelength resolution, whereas, in the case of DRAM, 2 to 3 times is consumed for measurement of a substrate front surface, but in the case of VNAND, more than 10 to 20 times is consumed. Accordingly, there are inevitable time constraints when evaluating multiple substrates.

That is, in the case of the conventional art, at the time of hyperspectral image measurement requiring high wavelength resolution, there is a drawback of lengthening the consumed time, and in particular, there were a problem that the reproducibility of the wavelength is deteriorated due to the operation of the motor that reciprocally rotates repeatedly.

In addition, since external vibration, environment, and electrical noise may intervene, and due to incorrect angular position, signals may be recorded in a state slightly different from the actual wavelength, making it difficult to match the spectrum of the light source between facilities. Fortunately, the disclosed spectroscopic device 10 for hyperspectral imaging including the optical module 100 according to the present disclosure attempts to improve these aforementioned problems.

And, according to the present disclosure, by using a toroidal diffraction grating 120, the high-speed rotational movement of the grating unit, which is heavier than conventional one, may disappear and thereby enhance the stability of the facility, by reducing movement and fixing time, and reducing the travel time.

Advantageously, the beam path, which is rotated by passing the beam through a toroidal diffraction grating 120 that is capable of splitting, collimating, and rotating the beam path, may be focused on the Fourier plane 132 within the digital micromirror array (DMD) 130.

In addition, the spectroscopic device 10 for hyperspectral imaging according to the present disclosure includes the optical module 100 described above. Specifically, the spectroscopic device 10 for hyperspectral imaging includes: (i) the optical module 100 having a diffraction grating 120 that is configured to split light emitted from the light source and incident through the slit 110, and rotate and focus the beam path, (ii) the digital micromirror array (DMD) 130 configured to assign a natural frequency for each wavelength of the focused beam, and (iii) the first optical fiber 140 configured to pass a first beam re-reflected at the digital micromirror array (DMD) 130. In addition thereto, a hyperspectral image system (HIS) 200 may be provided, which is configured to receive the first beam having pass through the first optical fiber 140, and direct the first beam reflected from a sample to be incident on a CMOS device 300, and the CMOS device 300 containing a lock-in amplifier module 310.

As shown in FIG. 1, the beam that is rotated through the diffraction grating 120 is focused on the Fourier plane 132 within the digital micromirror array (DMD) 130; and the digital micromirror array (DMD) 130 according to the present disclosure may perform the Fourier transform for each frequency of the beam focused on the Fourier plane 132. In some embodiments, the digital micromirror array (DMD) 130 may be configured as a spatial light modulator, and serves to modulate the amplitude and direction of the incident light. The digital micromirror array (DMD) 130 may have, on its surface, hundreds or even thousands of microscopic mirrors disposed in a rectangular array corresponding to pixels within the image to be displayed. These mirrors may be individually rotated by ±10 to 12° with respect to an ON-state or an OFF-state.

In the ON-state, the light from a projector bulb is reflected by the lens such that the pixel appears bright on the screen, and in the OFF-state, the light is directed to another place (in most cases, above a heat sink) such that the pixel appears dark. In order to create a grayscale, the mirrors are very rapidly toggled on and off, and the ratio of ON-time to OFF-time determines the shade (binary pulse-width modulation) that is generated.

In some embodiments, the mirrors themselves are made of aluminum and are generally about 16 micrometers square, and each mirror is mounted on a yoke via a rigid stem extending from a bottom surface of the mirror. This yoke may be supported by a flexible torsion hinge, which allows movement of the yoke (and thus the mirror) between its ON-position and OFF-position. Torsion hinges are relatively resistant to fatigue and vibration shock. Electrodes can control the position of the mirror by electrostatic attractive/repulsive force, and a pair of electrodes may be positioned on each side surface of the hinge, of which one acts on the yoke and the other one directly acts on the aluminum mirror.

Whereas a bias potential of about 20 to 30V is applied to the mirror and the yoke, the electrodes are addressed by using 5V CMOS device, when electrodes on one side surface with respect to the mirror are driven by +5V, the mirror is tilted toward an opposite side surface of which the electrodes are at 0V. In addition, if the CMOS voltage is reversed, the mirror is tilted in a different way. Therefore, the ON/OFF state of each mirror may be controlled by the CMOS device.

According to the present disclosure, by placing the Fourier plane 132, in which the broadband light source is spatially divided, on the digital micromirror array (DMD) 130, a natural frequency may be assigned to each wavelength, and after measuring the hyperspectral image by the CMOS device 300 containing the lock-in amplifier module 310 interlocked with the digital micromirror array (DMD) 130, the hyperspectral cube data may be obtained by decomposing and reconstructing the image by wavelengths.

Using the above processes, the spectroscopic device 10 for hyperspectral imaging according to the present disclosure may measure approximately 1,000 to 2,000 wavelength images, within a same time period for which approximately ten wavelength images are measure by using a conventional typical monochromator, which means the speed is increased by about 100 times or more.

Referring to FIG. 2, the hyperspectral image system (HIS) 200 receiving the beam reflected back to the path the same as the path incident on the digital micromirror array (DMD) 130 may include a high-resolution spectral inspection device 210 and a slant elliptical polarization inspection device 220. Advantageously, when the first beam is reflected back at the digital micromirror array (DMD) 130 and reflected on a first reflector and transferred from the first optical fiber is inserted, the hyperspectral image system (HIS) 200 may inspect the light reflected at the sample disposed in the sample measurement part (not shown), by using the spectral inspection device 210 and the polarization inspection device 220, and may direct the first beam reflected from the sample to be incident on the CMOS device 300.

The CMOS device 300 containing the lock-in amplifier module 310 is interlocked with the digital micromirror array (DMD) 130, and may measure the image. The path of each beam reflected at the digital micromirror array (DMD) 130 is described below with reference to the drawings.

FIG. 3 is a drawing for explaining the path of the first beam incident through the slit 110 in FIG. 1. After being reflected at the digital micromirror array (DMD) 130 and backwards along the incident path, and then diffracted through the diffraction grating 120, the first beam is then reflected from the first reflector 142, which extends between the slit 110 and the diffraction grating 120, towards an input of the first optical fiber 140. Advantageously, by utilizing the small diameter of the first optical fiber 140 as an aperture, the first beam that is reflected from the first reflector 142 to the first optical fiber 140 is transferred to the hyperspectral image system (HIS) 200 for image measurement, and then the first beam reflected from the sample at the hyperspectral image system (HIS) 200 becomes incident on the CMOS device 300, so as to measure the hyperspectral image.

Here, the digital micromirror array (DMD) 130 contains a micromirror column 131 and may include the Fourier plane 132, and the digital micromirror array (DMD) 130 assigns a natural frequency for each wavelength of the first beam focused on the Fourier plane 132 and performs the Fourier transform for each frequency. As will be understood by those skilled in the art, a Fourier transform (FT) means a transformation that decomposes a function of time or space into temporal or spatial frequency components, through which spectroscopic information required for the hyperspectral image measurement may be obtained.

The micromirror column 131 constituting the digital micromirror array (DMD) 130 are designed at each natural frequency, such that the digital micromirror array (DMD) 130 may decompose wavelengths according to the contained micromirror column 131 and encode it into different frequencies for respective wavelengths. Nonetheless, there may be no harmonic relationship between each natural frequency.

In the above process, since the wavelength is decomposed according to column, it becomes the light source having encoded different frequencies for respective wavelengths, and the light source may be reflected back at the digital micromirror array (DMD) 130, thereby passing the diffraction grating 120 to be further reflected at the first reflector 142, before being transferred to the hyperspectral image system (HIS) 200 via the first optical fiber 140. Accordingly, in the hyperspectral image system (HIS) 200, the first beam undergoes the process of being reflected at the sample, and thereafter, may be transferred to the CMOS device 300.

The CMOS device 300 according to the present disclosure is the CMOS device 300 containing the lock-in amplifier module 310, and may be interlocked with the digital micromirror array (DMD) 130, so as to measure the hyperspectral image. In particular, the CMOS device 300 is interlocked with the digital micromirror array (DMD) 130, and re-arranges the Fourier transformed image for each wavelength to reconstruct a hyperspectral imaging cube, so as to obtain hyperspectral imaging data by using a beam encoded with a specific frequency for each wavelength at the digital micromirror array (DMD) 130.

The CMOS device 300 is a photo sensor composed of a plurality of individual pixel sensors, and is overlayed into a color filter arrangement (CFA: color filter array) or a color filter mosaic (CFM: color filter mosaic), which is typically a small color filter array disposed on individual pixel sensors of the image sensor. Typical photo sensors detect light intensities with little or no wavelength specificity and cannot separate color information, so color filters are typically required. In addition, the lock-in amplifier module 310 contained in the CMOS device 300 is a type of amplifier that may extract a signal with a known carrier wave in a noisy environment, and has the function of extracting a very small signal buried in noise. The operating principle of this lock-in amplifier is based on mixing the measured signal (input signal) with a reference frequency and then performing low-pass filtering.

Figure 4:
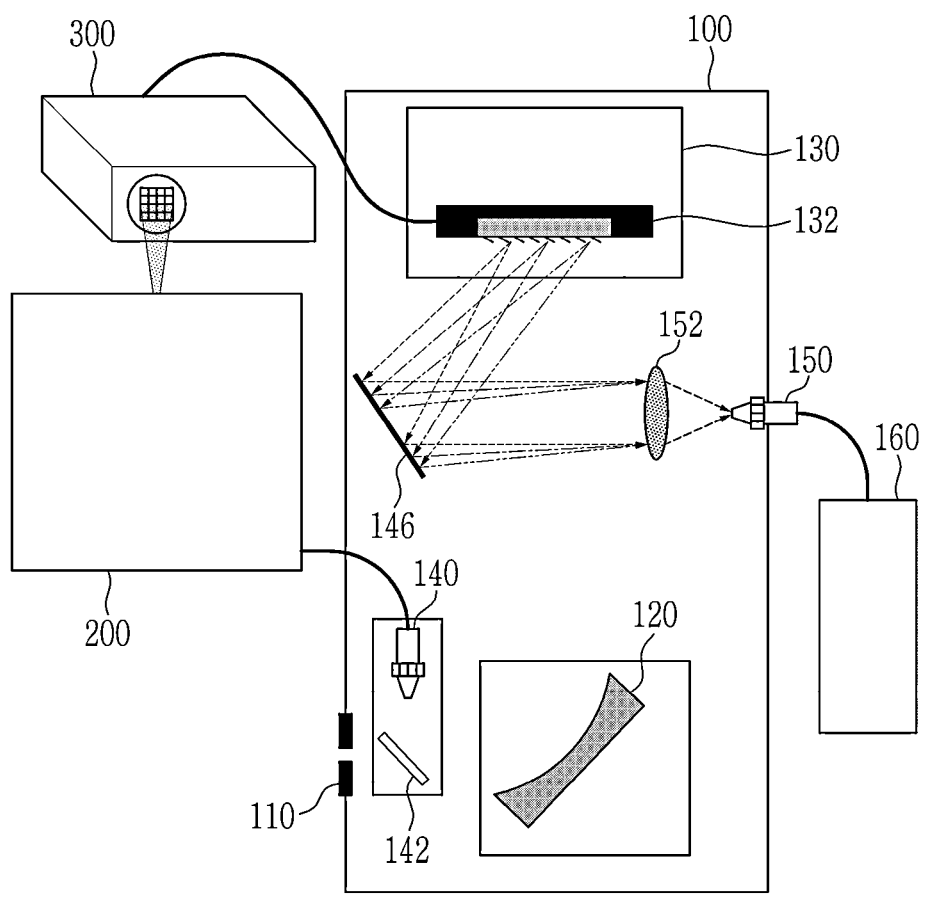
FIG. 4 is a drawing for explaining a spectroscopic device for hyperspectral imaging including an optical module, according to an embodiment.

FIG. 4 is a drawing for explaining the spectroscopic device 10 for hyperspectral imaging including an optical module 100 according to an embodiment. In particular, FIG. 4 is a drawing for explaining the path of a second beam excluding the first beam reflected the same as the incident path, among beams reflected back at the digital micromirror array (DMD) 130, and may further include a second reflector 146 configured to reflect the second beam. As shown in FIG. 4, the second reflector 146 disposed between the digital micromirror array (DMD) 130 and the diffraction grating 120 may be included, and the second reflector 146 serves to reflect the second beam reflected back at the digital micromirror array (DMD) 130 with a preset angle.

A lens 152 configured to focus the second beam reflected at the second reflector 146 on a second optical fiber 150 may be further included, and a small spectrometer 160 configured to record a spectrum of the second beam having passed through the second optical fiber 150 may be further included. A high-power white light source used in the spectroscopic device 10 for hyperspectral imaging including the optical module 100 according to the present disclosure generates a lot of fluctuation of intensity for a short and long period of time. In addition, there are differences between individuals, causing problems such as the acquired spectral signal changing over time or differences between facilities, so it is necessary to record the spectrum of the light source in real time and compensate the spectrum obtained at the same time from the sample.

By monitoring the second beam reflected by the digital micromirror array (DMD) 130 in a path different from the first beam, that is, the second beam that does not return to the toroidal diffraction grating 120, through the additional small spectrometer 160, the light source intensity may be checked in real time and used as the compensation reference. That is, in addition to the light source going to the sample for actual measurement at the digital micromirror array (DMD) 130, the light source abandoned for frequency encoding is used, by using an additional spectrometer, as background intensity for compensating temporal change of the initial light source, and the spectrometer 160 in the present disclosure may compensate fluctuation of the beam emitted from the light source by using the spectrum of the second beam, and capable of real-time compensation by monitoring the spectrum.

By utilizing the spectroscopic device 10 for hyperspectral imaging Including the optical module 100 of FIG. 1 to FIG. 4, the time for obtaining a wavelength high-resolution hyperspectral cube data may be shortened. In addition, as the toroidal diffraction grating 120 is used, high-speed rotation movement of the conventional grating unit disappears such that the stability of facility may be enhanced. Moreover, by including the spectrometer 160 configured to analyze the spectrum of the second beam excluding the first beam reflected to the same path incident on the digital micromirror array (DMD) 130, the reference for the compensation may be obtained without separately measuring the intensity of the light source.

Figure 5:
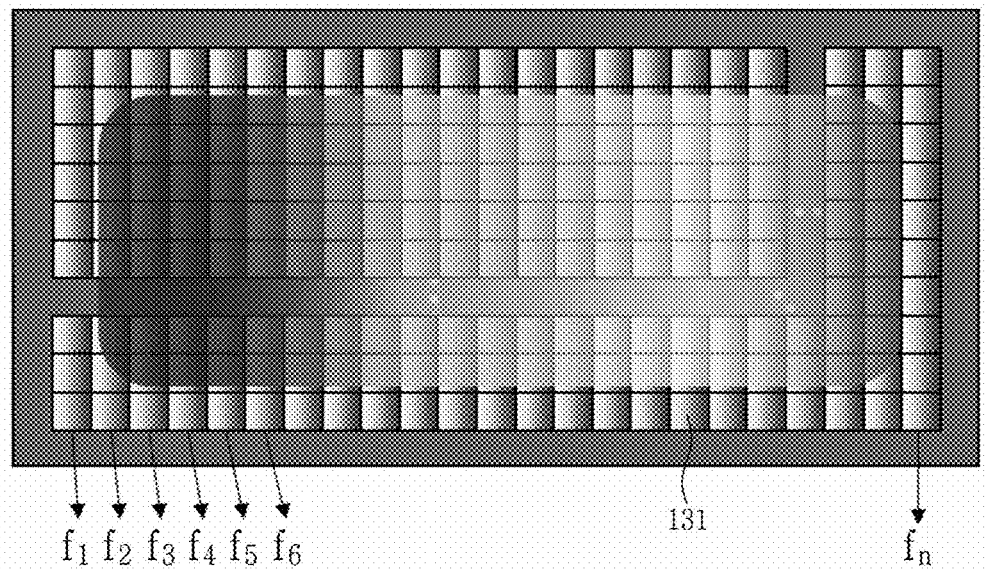
FIG. 5 is a drawing for explaining a digital micromirror array, in a spectroscopic device for hyperspectral imaging including an optical module, according to an embodiment.

FIG. 5 is a drawing for explaining the digital micromirror array (DMD) 130, in the spectroscopic device 10 for hyperspectral imaging including an optical module 100 according to an embodiment, and is a drawing for explaining the process of frequency encoding for each wavelength utilizing the digital micromirror array (DMD) 130. In the case of the digital micromirror array (DMD) 130, at a high speed (e.g., 15 kHz), the optical path of each mirror unit may be selected as one of two. When wavelength elements split by the toroidal diffraction grating 120 according to the present disclosure are spatially separated and focused on the Fourier plane 132, and the digital micromirror array (DMD) 130 is positioned on the Fourier plane 132, as shown in FIG. 5, each of different wavelengths may be continuously focused differently according to each column of the digital micromirror array (DMD) 130. It may be designed such that each column 131 among micromirrors of the digital micromirror array (DMD) 130 may oscillate at a specific frequency, and accordingly, the digital micromirror array (DMD) 130 assigns a natural frequency for each wavelength of the focused beam, and performs Fourier transform for each frequency of the beam focused on the Fourier plane 132.

Figure 6:
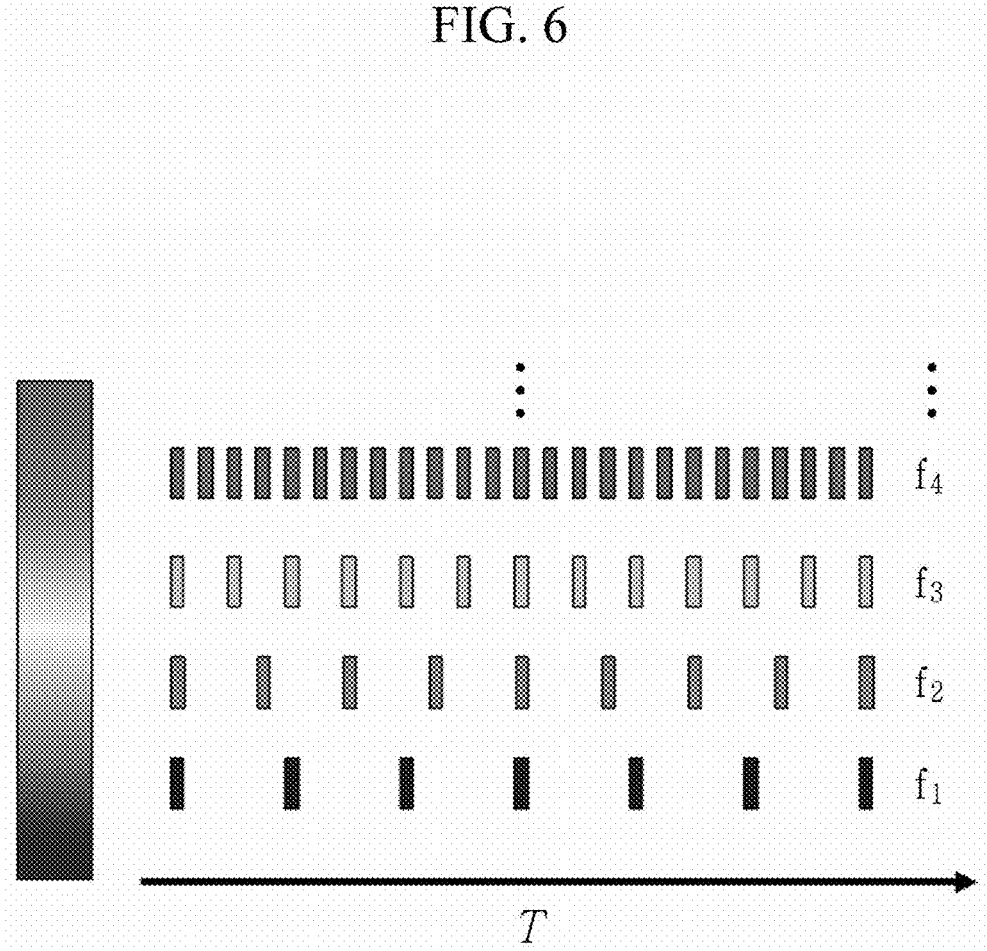
FIG. 6 is a drawing for explaining an encoding process for each frequency of a spectroscopic device for hyperspectral imaging including an optical module, according to an embodiment.
Figure 7:
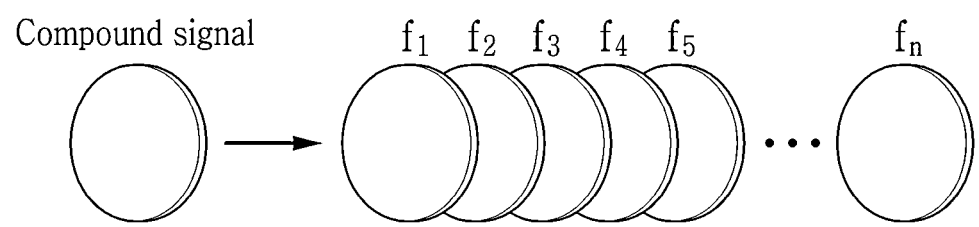
FIG. 7 is a drawing for explaining an encoding process for each frequency of a spectroscopic device for hyperspectral imaging including an optical module, according to an embodiment.

FIG. 6 and FIG. 7 are drawings for explaining an encoding process for each frequency of the spectroscopic device 10 for hyperspectral imaging including an optical module 100 according to an embodiment. As shown in FIG. 6 and FIG. 7, the light source in which the specific frequency band is encoded for each wavelength may be incident on the hyperspectral image system (HIS) 200. In the spectroscopic device 10 for hyperspectral imaging including the optical module 100 according to the present disclosure, as described above, the micromirror column 131 contained in the digital micromirror array (DMD) 130 oscillates at each natural frequency, wavelengths are decomposed according to the contained micromirror column 131, and encoding is possible with different frequencies for respective wavelengths, characterized by utilizing the light source encoded at a different frequency.

Figure 8:
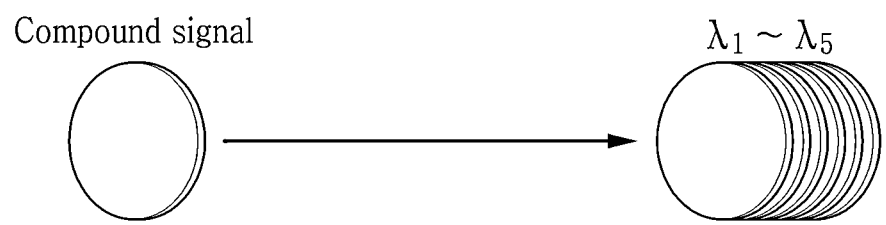
FIG. 8 is a drawing for explaining a reconstructed image for each wavelength in a spectroscopic device for hyperspectral imaging including an optical module, according to an embodiment.

FIG. 8 is a drawing for explaining a reconstructed image for each wavelength in the spectroscopic device 10 for hyperspectral imaging including an optical module 100 according to an embodiment. In particular, FIG. 8 is a drawing showing an image for each wavelength reconstructed through the CMOS device 300 containing the lock-in amplifier module 310, and the CMOS device 300 may obtain the hyperspectral imaging data by using a beam encoded with a specific frequency for each wavelength at the digital micromirror array (DMD) 130, and re-arrange the Fourier transformed image for each wavelength, so as to reconstruct the hyperspectral imaging cube. As shown in FIG. 8, after applying respective different vibration frequencies to the decomposed wavelengths formed on the digital micromirror array (DMD) 130, when the image for each frequency is reconstructed through the data by utilizing the CMOS device 300 containing the lock-in amplifier module 310, the hyperspectral imaging cube (x, y, λ) may be obtained at high speed.

That is, the first beam recollected after being reflected at the digital micromirror array (DMD) 130 and passing through the diffraction grating 120 is transferred to the hyperspectral image system (HIS) 200 through the first optical fiber 140, and the light reflected at the sample is measured by the CMOS device 300 interlocked with the digital micromirror array (DMD) 130, and converted the image for each frequency, so as to form the hyperspectral 3-dimensional cube. Advantageously, according to the present disclosure, the time required for the measurement according to the above process is inevitably shorter than that of the conventional art. Thus, the time required for measurement is not materially increased the even if the number of wavelengths constituting the spectrum increases.

An imaging measurement method using the spectroscopic device 10 for hyperspectral imaging according to the present disclosure may include a step in which the digital micromirror array (DMD) 130 encodes a beam emitted from a light source and passed through a diffraction grating 120 at different frequencies for respective wavelengths. And a step in which the diffraction grating 120 passes a first beam re-reflected from the digital micromirror array (DMD) 130 through a first optical fiber 140 and transmits to a hyperspectral imaging system (HIS) 200, a step in which the hyperspectral imaging system (HIS) 200 transmits the first beam reflected from a sample of the hyperspectral imaging system (HIS) 200 to a CMOS device 300 containing a lock-in amplifier module 310, and a step in which the CMOS device 300 interlocked with the digital micromirror array (DMD) 130 obtains the hyperspectral imaging data by using the encoded beam may be included.

A step of compensating fluctuation of the beam emitted from the light source by using the spectrum of the second beam excluding the first beam among beams reflected back at the digital micromirror array (DMD) 130 may be included. In the step of compensating, in addition to the light source going to the sample for actual measurement at the digital micromirror array (DMD) 130, the light source abandoned for frequency encoding is used, by using an additional spectrometer, as background intensity for compensating temporal change of the initial light source, and the fluctuation of the beam emitted from the light source by using the spectrum of the second beam may be compensated, and real-time compensation is possible by monitoring the spectrum.

As described above, the optical module 100, the spectroscopic device 10 for hyperspectral imaging, and the imaging measurement method using the same, according to the present disclosure, may shorten the time for obtaining a wavelength high-resolution hyperspectral cube data. In addition, by utilizing the toroidal diffraction grating, since the high-speed rotation movement of the conventional grating becomes unnecessary, the stability of facility may be enhanced, and by performing real-time monitoring by using the spectrum of the second beam reflected at the digital micromirror array (DMD) 130 in a different path, compensation of the signal may be done by checking the intensity of the light source in real time.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A spectroscopic device for hyperspectral imaging, the spectroscopic device, comprising:
   an optical module including: a diffraction grating configured to split a beam emitted from a light source and incident through a slit, and rotate and focus the beam, a digital micromirror array (DMD) configured to assign a natural frequency for each wavelength of the focused beam, and a first optical fiber configured to pass a first beam re-reflected from the DMD; and
   a hyperspectral image system (HIS) configured to receive the first beam having passed through the first optical fiber, and direct the first beam reflected from a sample to be incident on a CMOS device, which contains a lock-in amplifier module.

2. The spectroscopic device of claim 1, wherein the diffraction grating includes a toroidal diffraction grating.

3. The spectroscopic device of claim 1, wherein the diffraction grating includes a reflective diffraction grating.

4. The spectroscopic device of claim 1, wherein the diffraction grating collimates the beam.

5. The spectroscopic device of claim 1, wherein the diffraction grating is configured to rotate and focus the beam on a Fourier plane.

6. The spectroscopic device of claim 1, wherein the DMD is configured to perform a Fourier transform for each frequency of the beam focused on a Fourier plane.

7. The spectroscopic device of claim 1, wherein the first beam is, after being reflected at the DMD back to an incident path and then diffracted through the diffraction grating, reflected from a first reflector positioned between the slit and the diffraction grating and directed to the first optical fiber.

8. The spectroscopic device of claim 1, further comprising a reflector configured to redirect the beam that is reflected back from the DMD back to the diffraction grating to the first optical fiber.

9. The spectroscopic device of claim 1, further comprising a second reflector configured to reflect a second beam excluding the first beam among beams reflected back at the DMD.

10. The spectroscopic device of claim 9, wherein the second reflector is positioned between the DMD and the diffraction grating.

11. The spectroscopic device of claim 9, wherein the second reflector reflects the second beam reflected back at the DMD with a preset angle.

12. The spectroscopic device of claim 9, further comprising:
a lens configured to focus the second beam reflected at the second reflector onto a second optical fiber.

13. The spectroscopic device of claim 12, further comprising a spectrometer configured to record a spectrum of the second beam having passed through the second optical fiber.

14. The spectroscopic device of claim 13, wherein the spectrometer is configured to compensate a fluctuation of the beam emitted from the light source using the spectrum.

15. The spectroscopic device of claim 14, wherein the spectrometer is configured to provide real-time compensation by monitoring the spectrum.

16. The spectroscopic device of claim 1, wherein a micromirror column contained in the DMD oscillates at each natural frequency.

17. The spectroscopic device of claim 1, wherein the DMD is configured to decompose wavelengths according to a contained micromirror column and perform encoding at different frequencies for respective wavelengths.

18. The spectroscopic device of claim 1, wherein the CMOS device is interlocked with the DMD.

19. The spectroscopic device of claim 1, wherein the CMOS device is configured to obtain hyperspectral imaging data by using a beam encoded with a specific frequency for each wavelength at the DMD.

20. The spectroscopic device of claim 19, wherein the CMOS device is configured to re-arrange a Fourier transformed image for each the wavelength to reconstruct hyperspectral imaging cube.

* * * * *